(12) United States Patent
Yamamuro

(10) Patent No.: US 7,046,806 B2
(45) Date of Patent: May 16, 2006

(54) INFORMATION RECORDING APPARATUS AND METHOD, AND INFORMATION REPRODUCTION APPARATUS AND METHOD

(75) Inventor: Mikio Yamamuro, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 867 days.

(21) Appl. No.: 09/976,156

(22) Filed: Oct. 15, 2001

(65) Prior Publication Data

US 2002/0106083 A1      Aug. 8, 2002

(30) Foreign Application Priority Data

Oct. 16, 2000   (JP)   .............................. 2000-315511

(51) Int. Cl.
   *G06F 17/00*   (2006.01)
(52) U.S. Cl. ...................... 380/214; 380/210; 380/200
(58) Field of Classification Search ................ 380/214, 380/210, 200
   See application file for complete search history.

(56) References Cited

FOREIGN PATENT DOCUMENTS

| EP | 0 686 968 | 12/1995 |
|----|-----------|---------|
| EP | 0 822 555 | 2/1998  |
| EP | 0 843 445 | 5/1998  |
| EP | 0 872 830 | 10/1998 |

OTHER PUBLICATIONS

Compressed-domain scrambler/descrambler for digital video; Kankanhalli, M.S.; Teo Tian Guan; Consumer Electronics, IEEE Transactions on vol. 48, Issue 2, May 2002 pp.: 356-365.*

Forward error correction codes for MPEG2 over ATM; Shaw-Min Lei; Circuits and Systems for Video Technology, IEEE Transactions on vol. 4, Issue 2, Apr. 1994 pp.: 200-203.*

Design and implementation of MPEG-2/DVB scrambler unit and VLSI chip; Won-Ho Kim; Kyung-Jae Chen; Hyun-Suk Cho; Consumer Electronics, IEEE Transactions on vol. 43, Issue 3, Aug. 1997 pp.: 980-985.*

* cited by examiner

*Primary Examiner*—David Jung
(74) *Attorney, Agent, or Firm*—Oblon, Spivak, McClelland, Maier & Neustadt, P.C.

(57) ABSTRACT

As an example of this invention, user data which is broken up into sectors and is scrambled for each sector using a randomly generated scramble pattern, and scramble pattern data for specifying the scramble pattern used in scrambling are recorded on a recording medium.

6 Claims, 4 Drawing Sheets

INFORMATION RECORDING APPARATUS AND METHOD, AND INFORMATION REPRODUCTION APPARATUS AND METHOD

CROSS-REFERENCE TO RELATED APPLICATIONS

This application is based upon and claims the benefit of priority from the prior Japanese Patent Application No. 2000-315511, filed Oct. 16, 2000, the entire contents of which are incorporated herein by reference.

BACKGROUND OF THE INVENTION

1. Field of the Invention

The present invention relates to improvement of an information recording apparatus and method for recording information on a recording medium such as an optical disc or the like on/from which information can be written/read out. The present invention also relates to an information reproduction apparatus and method for reproducing information recorded on the recording medium.

2. Description of the Related Art

As is well known, recently, data rewritable optical discs have been developed and put into practical use. As data rewritable optical discs, for example, DVD (Digital Versatile Disc)-RAM (Random Access Memory), DVD-RW (Rewritable), and the like have prevailed.

In a data rewritable optical disc, when the user records, as digital data to be recorded, data as a long run of only one of two values, symmetry of RF (Radio Frequency) signals read upon reproduction is lost, thus adversely influencing various servo systems.

For this reason, digital data to be recorded undergoes a scramble process based on a scramble pattern generated by a pseudo random number generator or the like, so as to control one and the other values of data to have nearly equal frequencies of generation upon recording.

On the other hand, in the DVD format, digital data to be recorded is segmented into predetermined reference units called sectors, and is recorded on an optical disc while assigning addresses for respective sectors. In this case, the scramble process for digital data to be recorded is done for each sector, and scramble patterns to be used are permanently determined for respective addresses.

For this reason, in case of data such as management data, which is recorded at a predetermined location on an optical disc, is often changed only partially, and is rewritten entirely in a rewrite process, identical data undergoes a scramble process using an identical scramble pattern, and is repetitively recorded at an identical position on the optical disc.

In this case, since the scramble process of identical data using an identical scramble pattern always has an identical result, repetitively writing the scrambled data at an identical position on the optical disc consequently means to repetitively write identical data at an identical position on the optical disc.

However, when identical digital data is repetitively written at an identical position in response to every rewrite request like the management data, the rewrite life of the optical disc on which data is recorded using phase change marks may be impaired.

BRIEF SUMMARY OF THE INVENTION

The present invention has been made in consideration of the above situation, and has as its object to provide an information recording apparatus and method, which can minimize impairment of the rewrite life of a recording medium and can assure highly reliable data recording by preventing identical data from being repetitively written at an identical position.

It is another object of the present invention to provide an information reproduction apparatus and method which can attain highly reliable data reproduction from a recording medium on which data is recorded by the aforementioned information recording apparatus and method.

An information recording apparatus according to an embodiment of the present invention is directed to an information recording apparatus for scrambling digital data broken up into predetermined reference units, and recording the scrambled data on a recording medium. The apparatus comprises a scramble processor scrambling digital data for each predetermined reference unit using a randomly generated scramble pattern, and a recording controller recording scramble pattern information for specifying the scramble pattern used in scrambling by the scramble processor on the recording medium.

An information recording method according to an embodiment of the present invention is directed to an information recording method for scrambling digital data broken up into predetermined reference units, and recording the scrambled data on a recording medium. The method comprises the scramble processing step of scrambling digital data for each predetermined reference unit using a randomly generated scramble pattern, and the recording control step of recording scramble pattern information for specifying the scramble pattern used in scrambling in the scramble processing step on the recording medium.

An information reproduction apparatus according to an embodiment of the present invention is directed to an information reproduction apparatus for reproducing a recording medium on which digital data that have been broken up into predetermined reference units and have been scrambled respectively using randomly generated scramble patterns, and scramble pattern information for specifying the scramble pattern used to scramble each piece of digital data of the predetermined reference unit are recorded.

The apparatus comprises a descramble pattern generator generating a corresponding descramble pattern on the basis of the scramble pattern information read from the recording medium, and a descramble processor descrambling the digital data of the reference unit read from the recording medium on the basis of the descramble pattern generated by the descramble pattern generator.

An information reproduction method according to an embodiment of the present invention is directed to an information reproduction method for reproducing a recording medium on which digital data that have been broken up into predetermined reference units and have been scrambled respectively using randomly generated scramble patterns, and scramble pattern information for specifying the scramble pattern used to scramble each piece of digital data of the predetermined reference unit are recorded.

The method comprises the descramble pattern generation step of generating a corresponding descramble pattern on the basis of the scramble pattern information read from the recording medium, and the descramble processing step of descrambling the digital data of the reference unit read from the recording medium on the basis of the descramble pattern generated in the descramble pattern generation step.

DETAILED DESCRIPTION OF THE INVENTION

Figure 1:
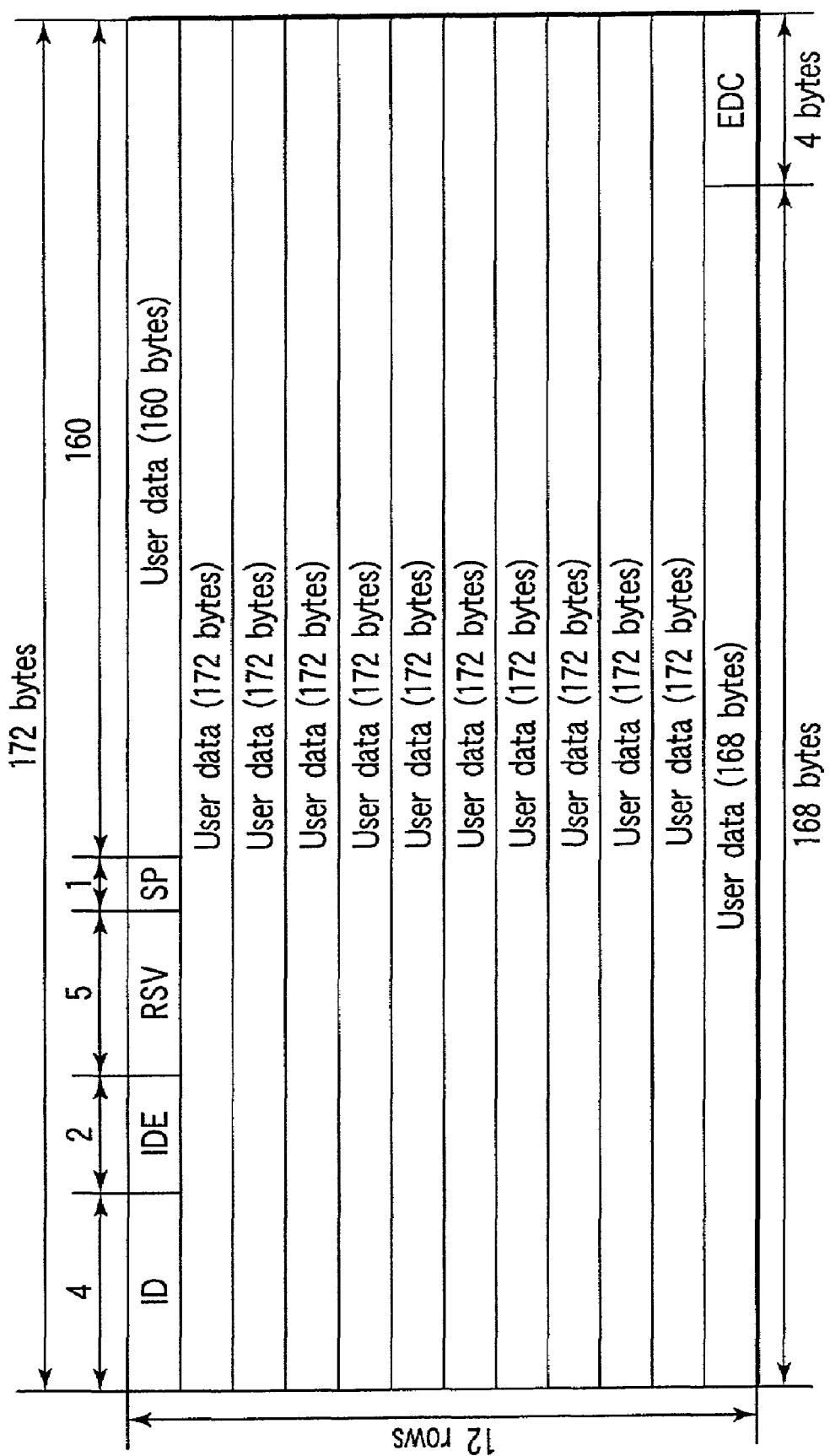
FIG. 1 is a view for explaining the data format of digital data to be recorded per sector according to an embodiment of the present invention.

An embodiment of the present invention will be described in detail hereinafter with reference to the accompanying drawings. FIG. 1 shows the data format for one sector. Digital data to be recorded is broken up into sectors each having the structure shown in FIG. 1, undergoes a scramble process for respective sectors, and is recorded on a recording medium such as an optical disc.

One sector consists of 172 bytes×12 rows=2064 bytes, and contains 4-byte identification data ID, a 2-byte ID error detection code IED, a 5-byte reserve field RSV, 1-byte scramble pattern data SP indicating a scramble pattern used, 2,048-byte user data, and a 4-byte error detection code EDC.

Figure 2:
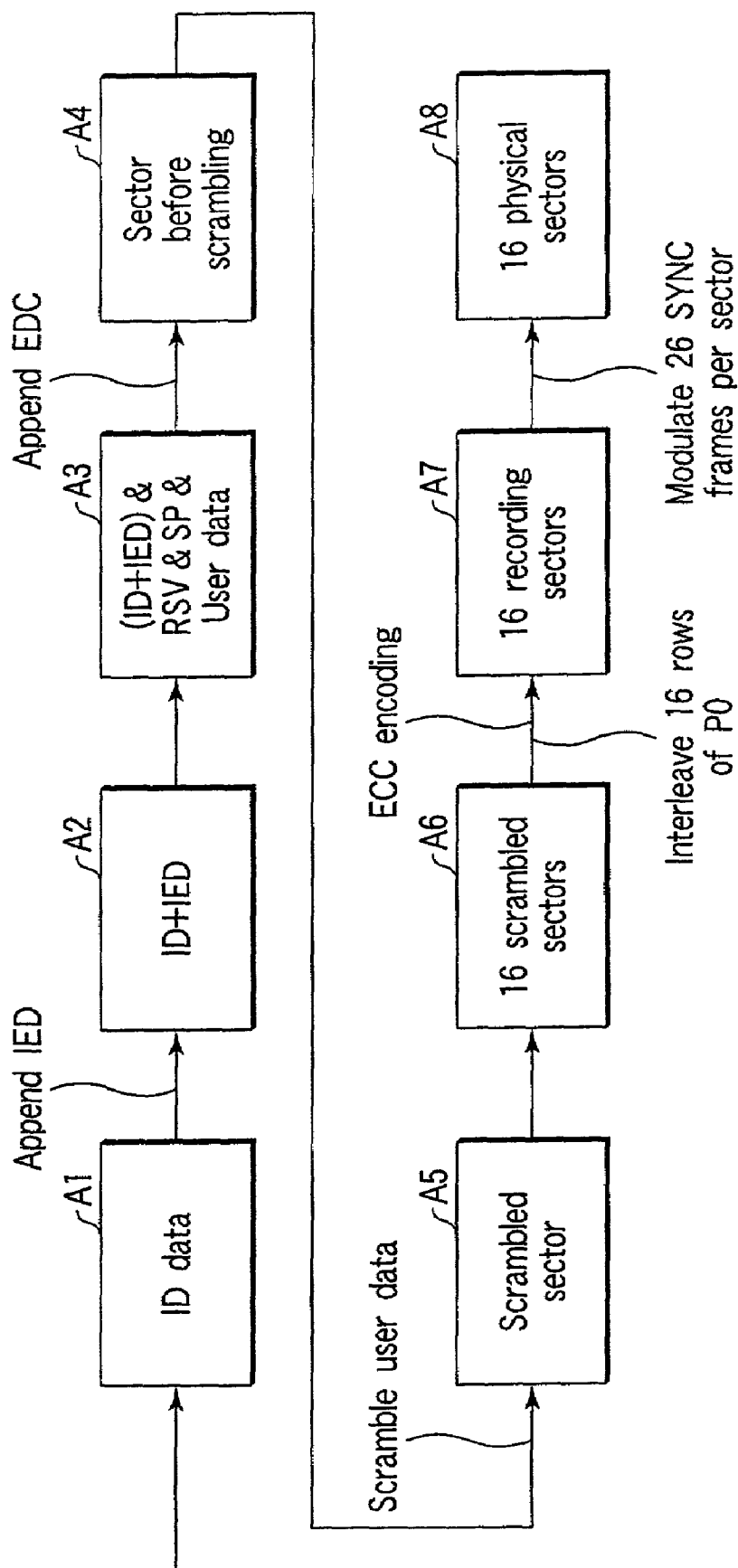
FIG. 2 is a chart for explaining the processing sequence for forming sectors of user data and converting them into physical data to be recorded in the embodiment of the present invention.

FIG. 2 shows the processing sequence for forming sectors from digital data to be recorded, and converting them into physical data to be recorded on a recording medium. After identification data ID, ID error detection code IED, a reserve field RSV, and scramble pattern data SP are appended to 2048-byte user data (steps A1, A2, and A3), an error detection code EDC for the user data is generated and appended to form a sector before a user data scramble process (step A4).

After that, the user data undergoes a scramble process using a scramble pattern designated by the scramble pattern SP to obtain a scrambled sector (step A5). A cross Reed-Solomon error correction code ECC is generated and appended for 16 scrambled sectors (step A6).

Recording sectors are those after the ECC is appended, and error correction codes PI and PO are also appended (step A7). Physical sectors are data after sync codes (SYNC codes) are appended at the heads of every 91 bytes of the recording sectors, and 8-16 modulation is executed (step A8).

Figure 3:
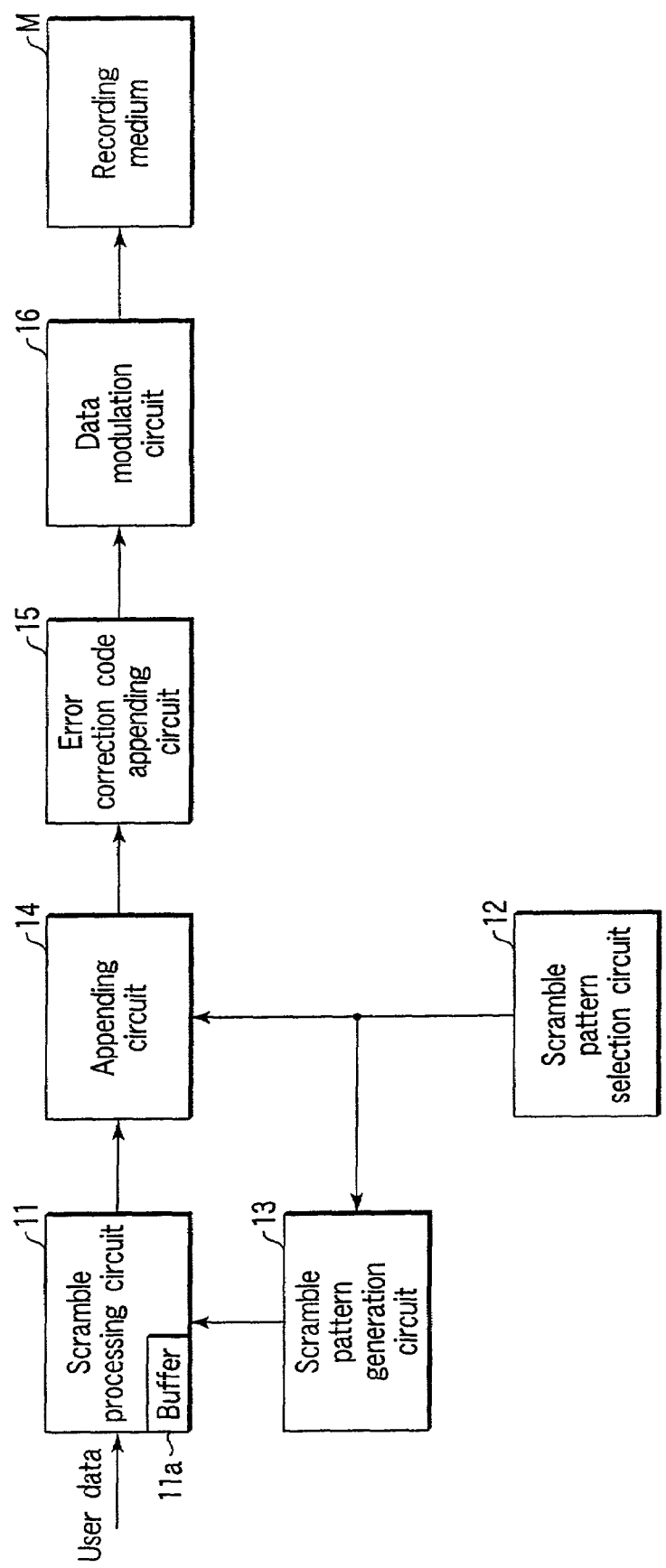
FIG. 3 is a block diagram for explaining an information recording apparatus for forming sectors of user data and converting them into physical data to be recorded in the embodiment of the present invention.

FIG. 3 shows an information recording apparatus for forming sectors from digital data to be recorded, and converting them into physical data to be recorded on a recording medium. User data is broken up into sectors, and is supplied to a scramble processing circuit 11.

The scramble processing circuit 11 scrambles user data of the input sector on the basis of a scramble pattern output from a scramble pattern generation circuit 13 in accordance with an instruction from a scramble pattern selection circuit 12, and stores the scrambled data in its internal buffer 11a.

The scrambled user data output from the scramble processing circuit 11 is supplied to an appending circuit 14, and is appended with additional information such as identification data ID, an ID error detection code IED, reserve field RSV, scramble pattern data SP, an error detection code EDC, address data indicating the logical address of data, and the like.

In this case, the scramble pattern data SP is information that specifies the scramble pattern the scramble pattern selection circuit 12 makes the scramble pattern generation circuit 13 output, and is supplied from the scramble pattern selection circuit 12.

After that, the sector data output from the appending circuit 14 is supplied to an error correction code appending circuit 15, and is appended with an ECC code. The sector data to which the ECC code is appended by the error correction code appending circuit 15 is supplied to a data modulation circuit 16, undergoes 8-16 modulation, and is then recorded on a recording medium M such as an optical disc or the like.

In this case, the scramble pattern selection circuit 12 controls the scramble pattern generation circuit 13 to randomly change a scramble pattern even for a sector to be recorded at an identical position, i.e., an identical address on the recording medium M every write.

For this reason, even when identical data is repetitively recorded at an identical position on the recording medium M, since the scramble pattern randomly changes every recording, different physical data is recorded on the recording medium M in practice. In this manner, identical data can be prevented from being repetitively written at an identical position, and the rewrite life of the recording medium M is prolonged, thus assuring highly reliable data recording.

Figure 4:
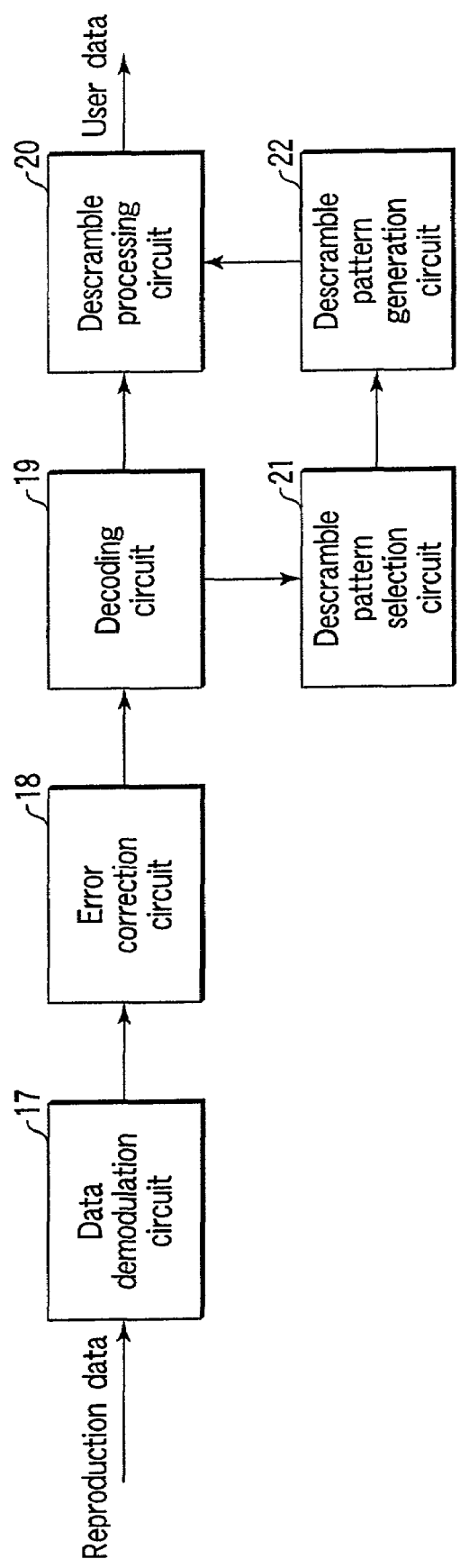
FIG. 4 is a block diagram for explaining an information reproduction apparatus for reproducing a recording medium in the embodiment of the present invention.

FIG. 4 shows an information reproduction apparatus for reproducing the recording medium M on which data is recorded as described above. Reproduction data read from the recording medium M is supplied to a data demodulation circuit 17, undergoes 16-8 demodulation, and then undergoes error correction using the ECC code by an error correction circuit 18.

After that, data of a reference unit (for each sector) that has undergone error correction is supplied to a decoding circuit 19 to decode the identification data ID, ID error detection code IED, reserve field RSV, scramble pattern data SP, and error detection code EDC as well as user data.

Of these data, the user data output from the decoding circuit 19 is supplied to a descramble processing circuit 20, and is descrambled. In this case, the scramble pattern data SP decoded by the decoding circuit 19 is supplied to a descramble pattern selection circuit 21.

The descramble pattern selection circuit 21 controls a descramble pattern generation circuit 22 to generate a required descramble pattern on the basis of the input scramble pattern data SP. The descramble processing circuit 20 descrambles the input user data on the basis of the descramble pattern output from the descramble pattern generation circuit 22, and outputs the descrambled data as user data.

That is, a descramble pattern required for the descramble process is generated on the basis of the scramble pattern data SP read from the recording medium M to descramble data read from the recording medium M. Hence, even when the scramble pattern randomly changes every recording, original user data can be accurately descrambled, thus allowing highly reliable data reproduction.

In the above embodiment, only the user data is scrambled. However, the present invention is not limited to this. For example, the identification data ID, ID error detection code IED, reserve field RSV, scramble pattern data SP, error detection code EDC, and the like may be scrambled simultaneously or individually, thus obtaining the same effect.

What is claimed is:

1. An information recording apparatus for scrambling digital data broken up into predetermined reference units, appending predetermined additional information to the scrambled data, and recording the scrambled data on a recording medium, comprising:
    a scramble processor configured to scramble digital data for each predetermined reference unit using a randomly generated scramble pattern; and
    a recording controller configured to record scramble pattern information for specifying the scramble pattern used in scrambling by said scramble processor on the recording medium to be included in the additional information,
    wherein the additional information has identification information for identifying the reference unit,
    the scramble processor scrambles the identification information, and
    the recording controller allocates the additional information at a head of each reference unit, and records the scramble pattern information on the recording medium between the identification information and the digital data.

2. An apparatus according to claim 1, wherein said scramble processor scrambles the digital data for the reference unit written at an identical position of the recording medium using a different scramble pattern for each write.

3. An information recording method for scrambling digital data broken up into predetermined reference units, appending predetermined additional information to the scrambled data, and recording the scrambled data on a recording medium, comprising:
    a scramble processing step of scrambling digital data for each predetermined reference unit using a randomly generated scramble pattern; and
    a recording control step of recording scramble pattern information for specifying the scramble pattern used in scrambling in the scramble processing step on the recording medium to be included in the additional information,
    wherein the additional information has identification information for identifying the reference unit,
    the scramble processing step scrambles the identification information, and
    the recording control step includes the step of allocating the additional information at a head of each reference unit, and recording the scramble pattern information on the recording medium between the identification information and the digital data.

4. A method according to claim 3, wherein the scramble processing step includes the step of scrambling digital data for the reference unit written at an identical position of the recording medium using a different scramble pattern for each write.

5. An information reproduction apparatus for reproducing a recording medium on which digital data that have been broken up into predetermined reference units and have been scrambled respectively using randomly generated scramble patterns, and additional information, which comprises scramble pattern information for specifying the scramble pattern used to scramble each piece of digital data of the predetermined reference unit and scrambled identification information for identifying the reference unit, and which are allocated at a head of each of the reference units, are recorded, comprising:
    a descramble pattern generator configured to extract the scramble pattern information from the additional information read from the recording medium, and generating a corresponding descramble pattern on the basis of the scramble pattern information; and
    a descramble processor configured to descramble the digital data of the reference unit read from the recording medium on the basis of the descramble pattern generated by said descramble pattern generator.

6. An information reproduction method for reproducing a recording medium on which digital data that have been broken up into predetermined reference units and have been scrambled respectively using randomly generated scramble patterns, and additional information, which comprises scramble pattern information for specifying the scramble pattern used to scramble each piece of digital data of the predetermined reference unit and scrambled identification information for identifying the reference unit, and which are allocated at a head of each of the reference units, are recorded, comprising:
    a descramble pattern generation step of extracting the scramble pattern information from the additional information read from the recording medium, and generating a corresponding descramble pattern on the basis of the scramble pattern information; and
    a descramble processing step of descrambling the digital data of the reference unit read from the recording medium on the basis of the descramble pattern generated in the descramble pattern generation step.

* * * * *